United States Patent [19]
Rourke

[11] Patent Number: 5,191,429
[45] Date of Patent: Mar. 2, 1993

[54] ELECTRONIC PRINTING SYSTEM FOR PRINTING MULTIPLE IMAGES WITH DETERMINATION OF THE MAXIMUM NUMBER OF REDUCED SIZE IMAGES TO BE OPTIMALLY PRINTED ON A SHEET OF DETECTED SIZE WITHOUT INTERFERENCE

[75] Inventor: John L. Rourke, Fairport, N.Y.

[73] Assignee: Xerox Corporation, Stamford, Conn.

[21] Appl. No.: 590,628

[22] Filed: Sep. 28, 1990

[51] Int. Cl.$^5$ .................... H04N 1/23; H04N 1/393
[52] U.S. Cl. .................. 358/296; 358/401; 358/449; 358/450; 358/451
[58] Field of Search ............ 358/296, 401, 451, 449, 358/450, 452, 453

[56] References Cited

U.S. PATENT DOCUMENTS

| | | | |
|---|---|---|---|
| 4,342,052 | 7/1982 | Rackley et al. | 358/287 |
| 4,591,904 | 5/1986 | Urabe et al. | 358/75 |
| 4,667,248 | 5/1987 | Kanno | 358/280 |
| 4,672,462 | 6/1987 | Yamada | 358/280 |
| 4,673,988 | 6/1987 | Jansson et al. | 358/280 |
| 4,849,829 | 7/1989 | Maruyama | 358/451 |
| 4,893,194 | 1/1990 | Sakata | 358/451 |
| 4,899,227 | 2/1990 | Yamada | 358/451 |
| 4,947,269 | 8/1990 | Yamada | 358/451 |

*Primary Examiner*—Benjamin R. Fuller
*Assistant Examiner*—Scott A. Rogers
*Attorney, Agent, or Firm*—Frederick E. McMullen

[57] ABSTRACT

An electronic printing system for printing multiple up images in which image signals representative of the multiple up image may be input from a remote source or a small document bearing the multiple up image scanned to provide image signals, the size of the multiple up image determined, the size of the paper stock on which the multiple up images are to be printed determined, and the maximum number of multiple up images that can be printed without interference on the paper stock calculated for printing.

10 Claims, 15 Drawing Sheets

ELECTRONIC PRINTING SYSTEM FOR PRINTING MULTIPLE IMAGES WITH DETERMINATION OF THE MAXIMUM NUMBER OF REDUCED SIZE IMAGES TO BE OPTIMALLY PRINTED ON A SHEET OF DETECTED SIZE WITHOUT INTERFERENCE

The invention relates to electronic printers and printing systems, and more particularly, to a process for printing multiple up images.

It is sometimes desirable to make multiple copies of small images as for example of a business card. However, since the image source, i.e., a business card, is smaller than normal, conventional copying by placing the card on the platen of a copier and running the desired number of copies cannot readily be done. This is because the copier is designed to make a copy of the entire platen area so that the resulting copies that are made will include not only the image from the card but also a large non-image area around the card. In that situation, to obtain copies of the small image, the copies that are made must then be cut to remove the unwanted and extraneous non-image areas or a make ready original prepared. This results in a substantial waste of copy paper, excessive copying costs since a full copy must be made for each image desired, and a very time consuming and inefficient job. And in cases where the multiple up image is a duplex image, copying becomes almost impossible due to the inability to accurately register and size the second side image with the first side image.

In the prior art, U.S. Pat. No. 4,591,904 to Urabe et al discloses an apparatus for scanning color originals, processing the image signals to enhance color rendition, and positioning the images sequentially on a recording member. U.S. Pat. No. 4,342,052 to Rackley et al discloses a facsimile device which scans four documents, electronically reduces each document image to match a predetermined set of dimensions, and places the reduced size images in one of four corners of a single copy. U.S. Pat. No. 4,667,248 to Kanno discloses a document image editing device which reads a plurality of documents, displays the images on a display device for editing, and stores the edited images into discrete sections of a page memory for use in creating a pasteboard image for printing while U.S. Pat. No. 4,672,462 to Yamada discloses a technique for recording plural images on both sides of a copy sheet in which a scanner reads a plurality of documents on an scanning drum, stores the images from memory, retrieves the images for display on a monitor, re-orients the images into a preferential image layout, and prints the resulting composite image onto a recording medium. And U.S. Pat. No. 4,673,988 to Jansson et al discloses an electronic imaging process for creating high resolution electronic mosaic images wherein a sequence of individual image segments extracted from an object within an optically read document are combined into a single integrated image for display.

In contrast, the present invention provides a process for printing reduced size multiple up images in an electronic reprographic printer, comprising the steps of: providing an electronic page comprised of image signals representative of the multiple up image; from the electronic page, determining the size of the multiple up image; determining the size of the paper stock on which the multiple up images are to be printed by the printer; determining the maximum number N of the multiple up images that can be optimally fitted onto the paper stock without interference; and in a single pass, using the electronic page to print printing the multiple up images N times on each of the paper stock.

IN THE DRAWINGS

Figure 1:
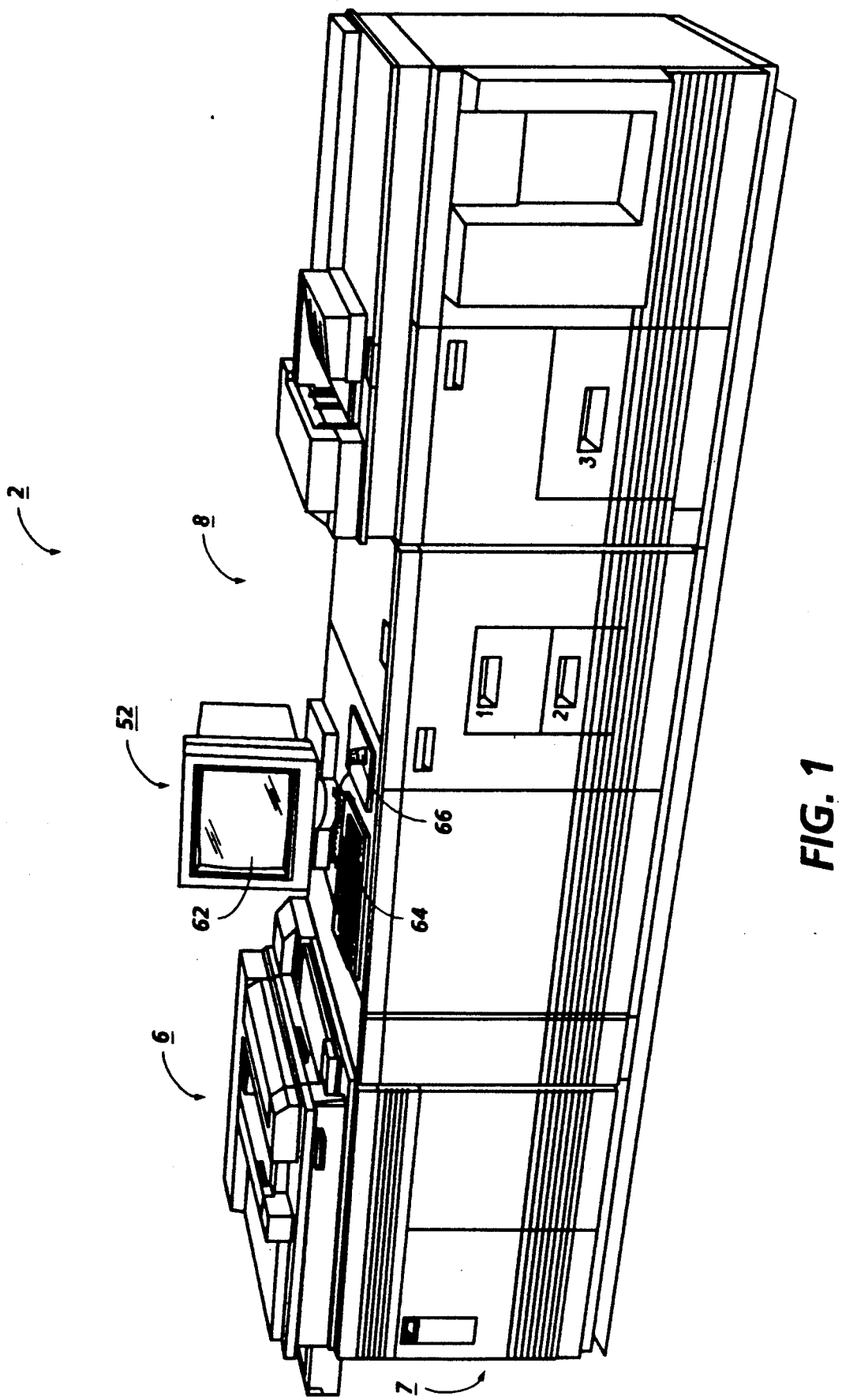
FIG. 1 is a view depicting an electronic printing system incorporating the multiple up printing process of the present invention.
Figure 5A:
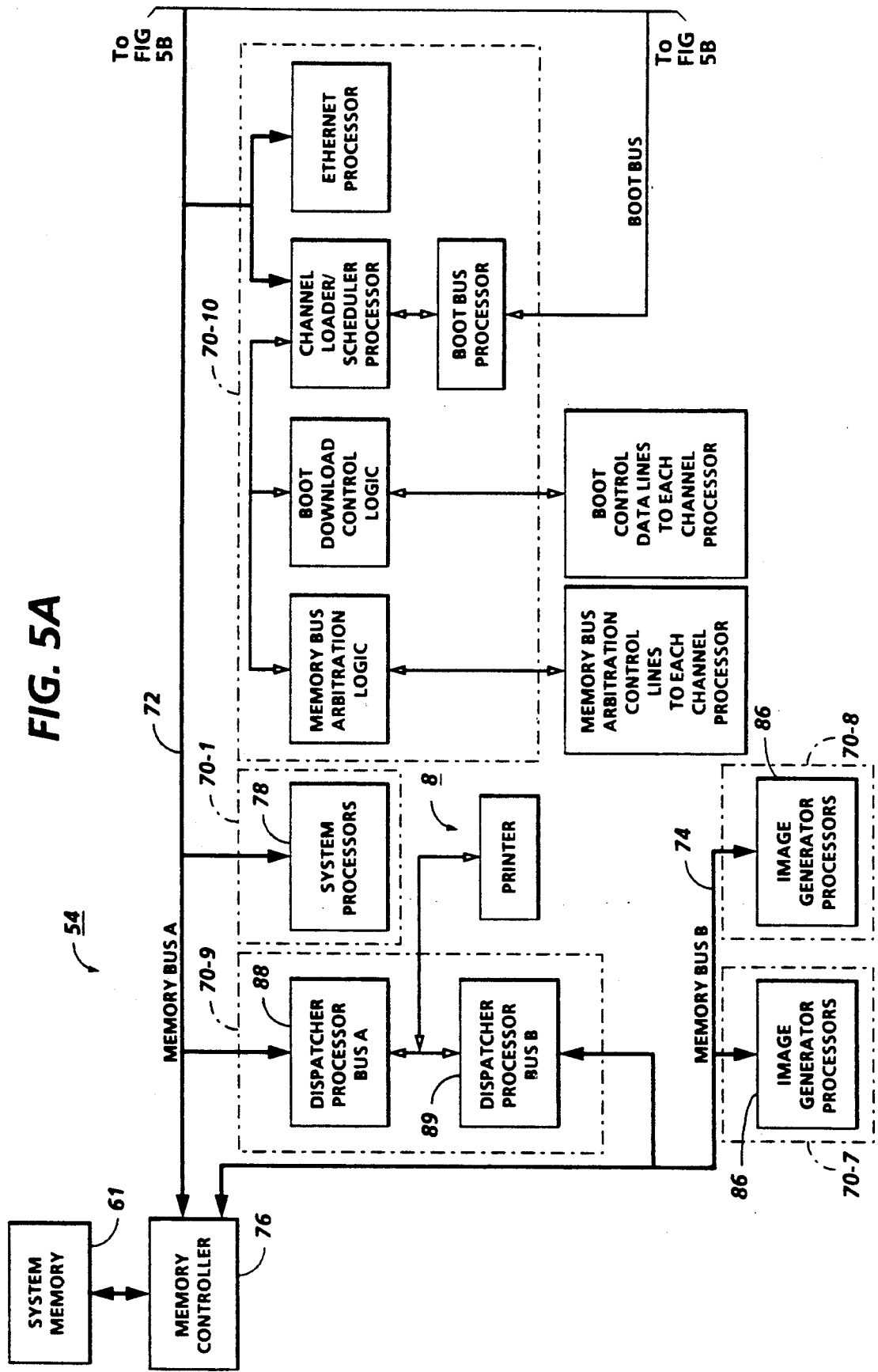
Figure 5B:
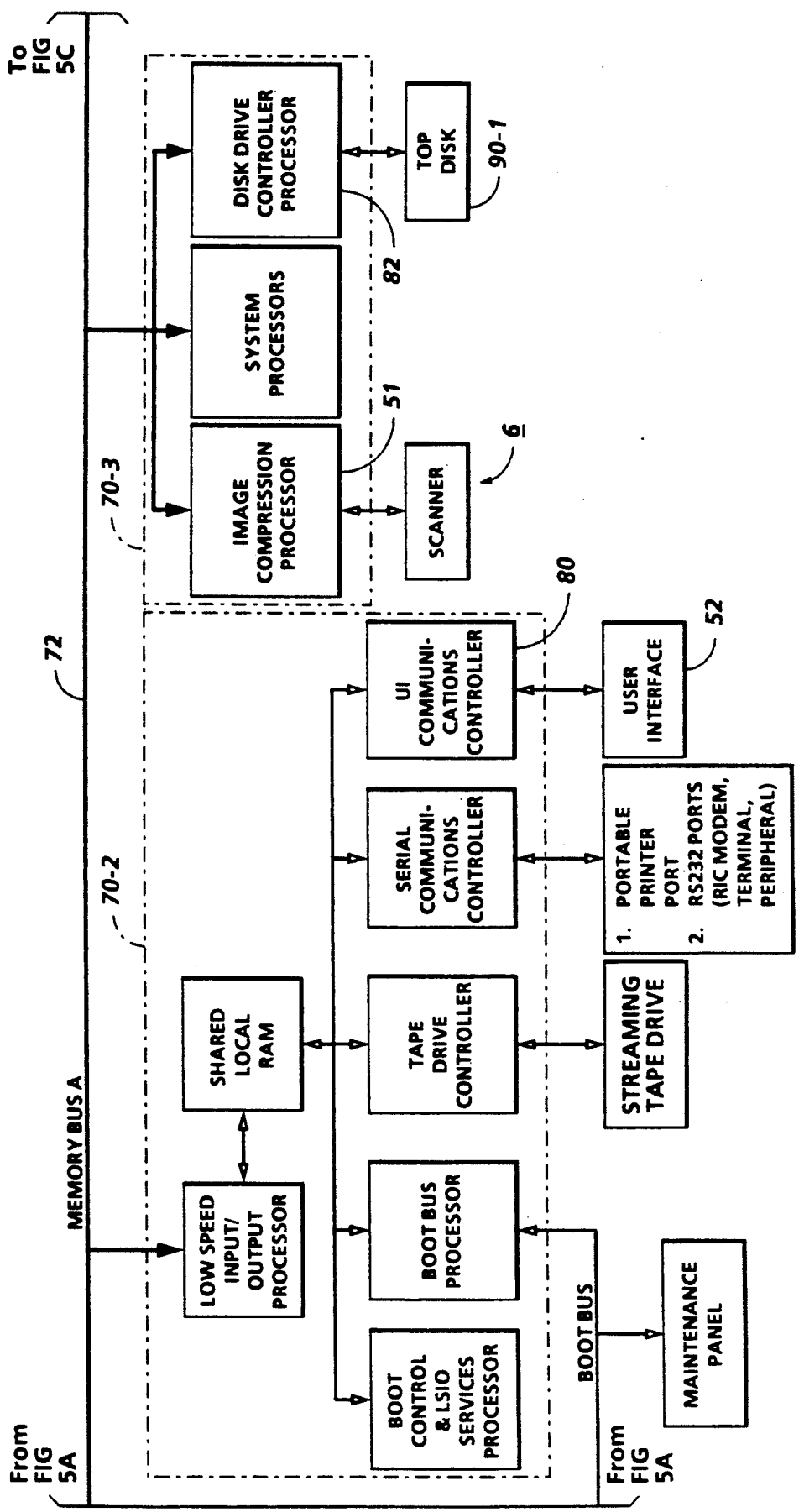
Figure 5C:
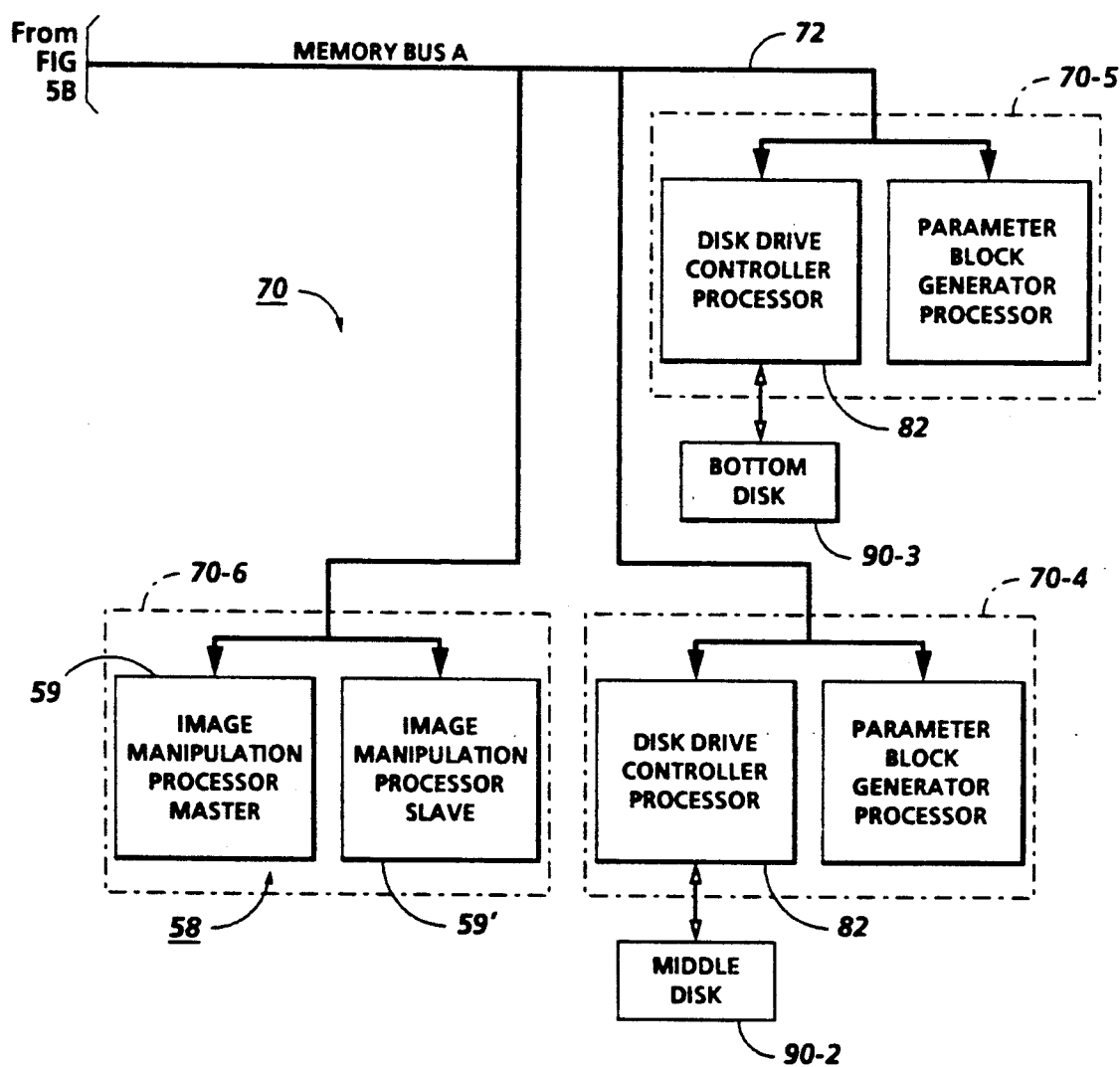
Figure 6:
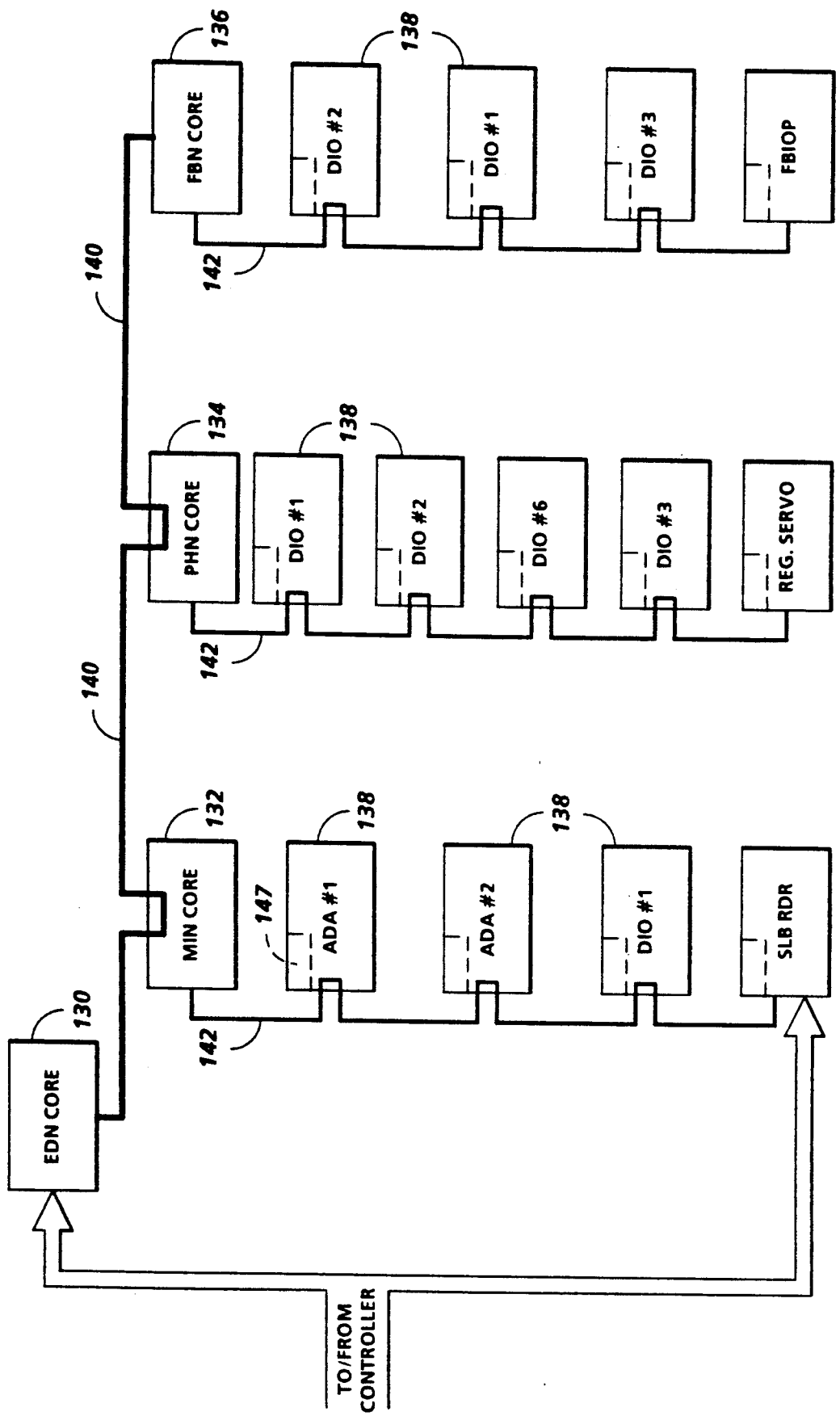
Figure 7:
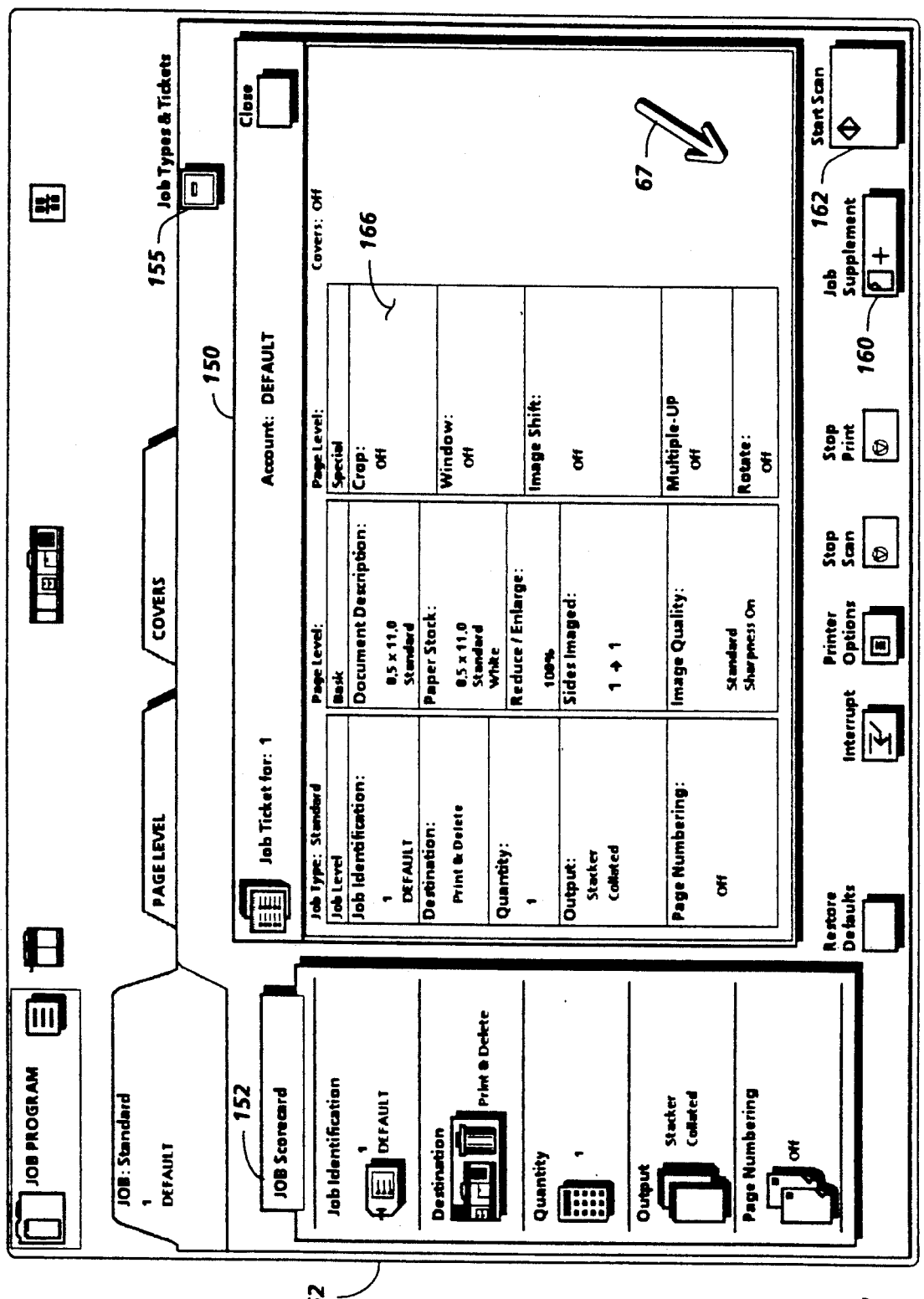
Figure 8:
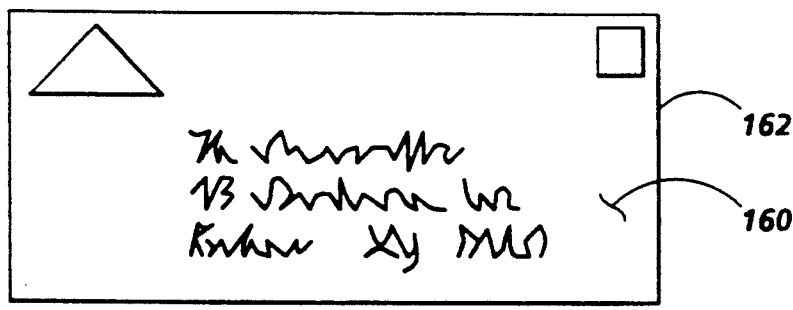
Figure 9:
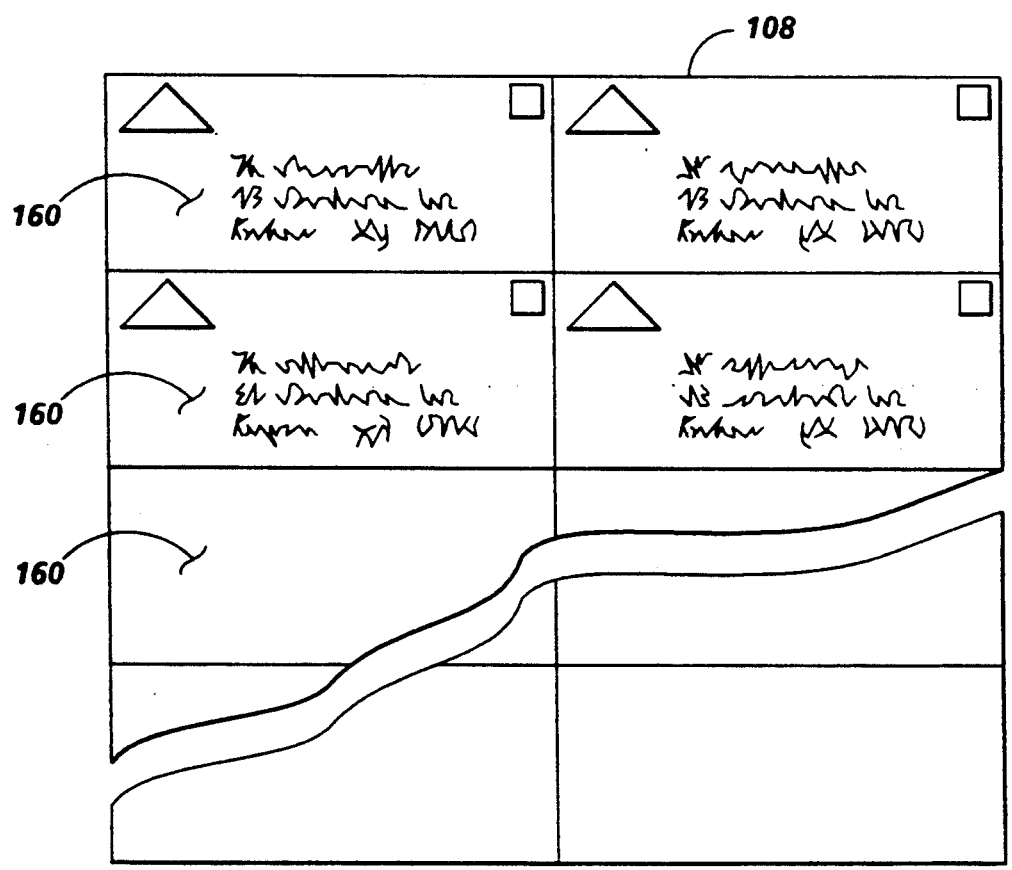
Figure 10:
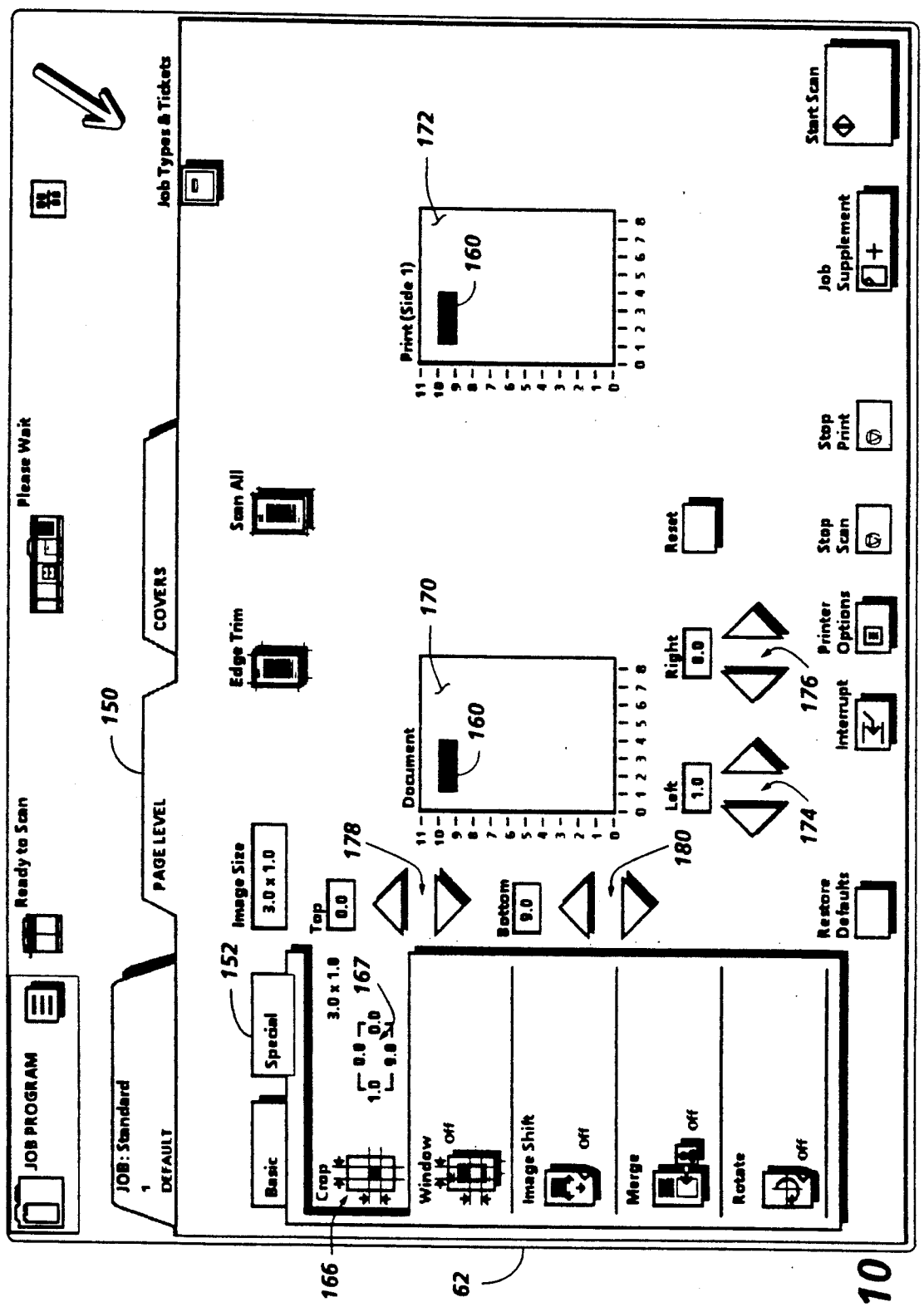
Figure 11:
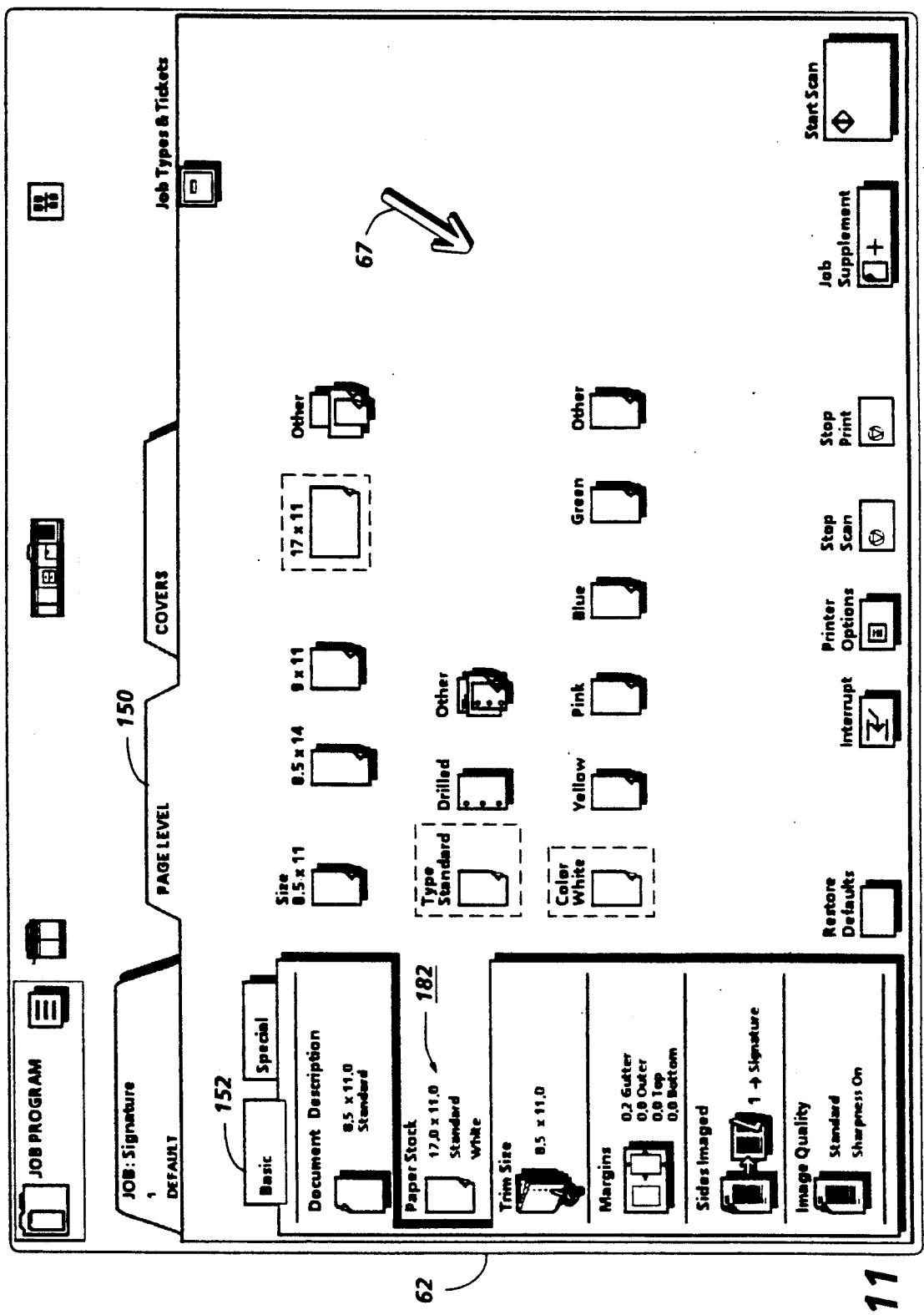
Figure 12:
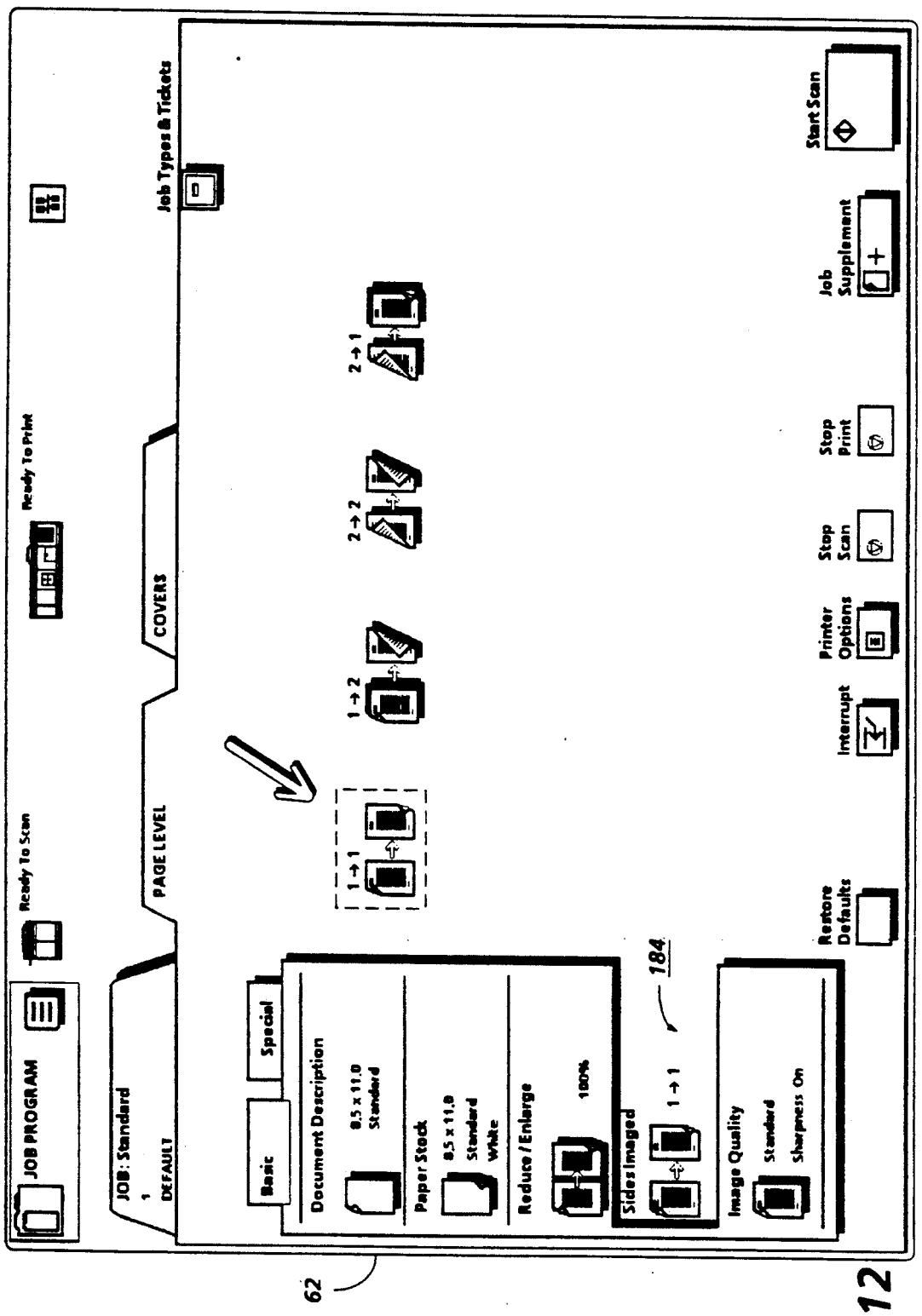
Figure 13:
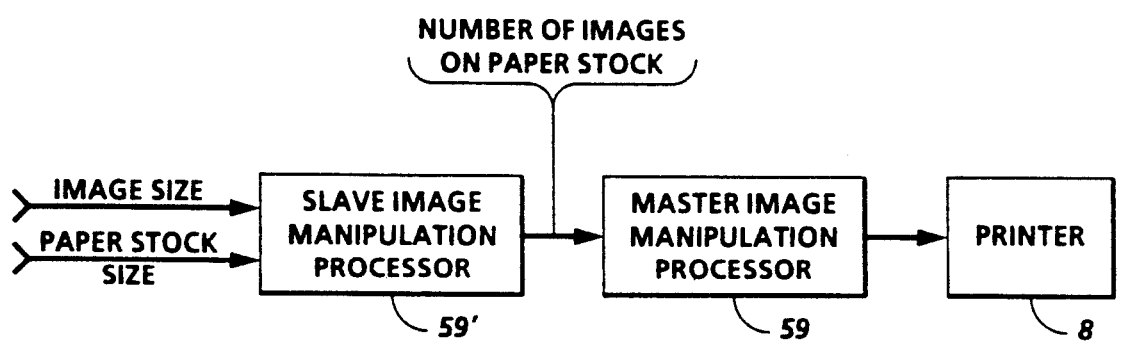
Figure 14:
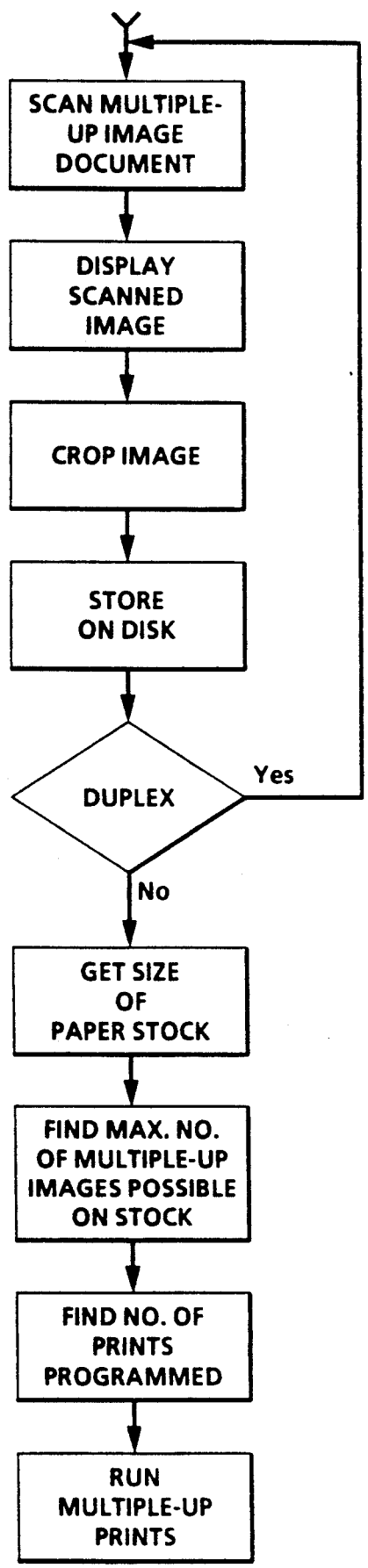

FIGS. 5A, 5B, and 5C comprise a schematic block diagram showing the major parts of the control section for the printing system shown in FIG. 1;

FIG. 6 is a block diagram of the Operating System, together with Printed Wiring Boards and shared line connections for the printing system shown in FIG. 1;

FIG. 7 is a view depicting a Job Ticket with Job Scorecard for programming multiple up printing jobs as displayed on the User Interface (UI) touchscreen of the printing system shown in FIG. 1;

FIG. 8 is a plan view showing a typical multiple up image source;

FIG. 9 is a plan view illustrating a sheet of Paper Stock with multiple up images following printing by the printing system shown in FIG. 1;

FIG. 10 is a view depicting the programming display for cropping an image;

FIG. 11 is a view depicting the programming display for changing Paper Stock;

FIG. 12 is a view depicting the programming display for selecting sides imaged;

FIG. 13 is a schematic block diagram of the control system for determining the maximum number of multiple up images that can be printed on a sheet of Paper Stock; and FIG. 14 is a flow chart depicting the process for printing multiple images in accordance with the present invention.

Figure 2:
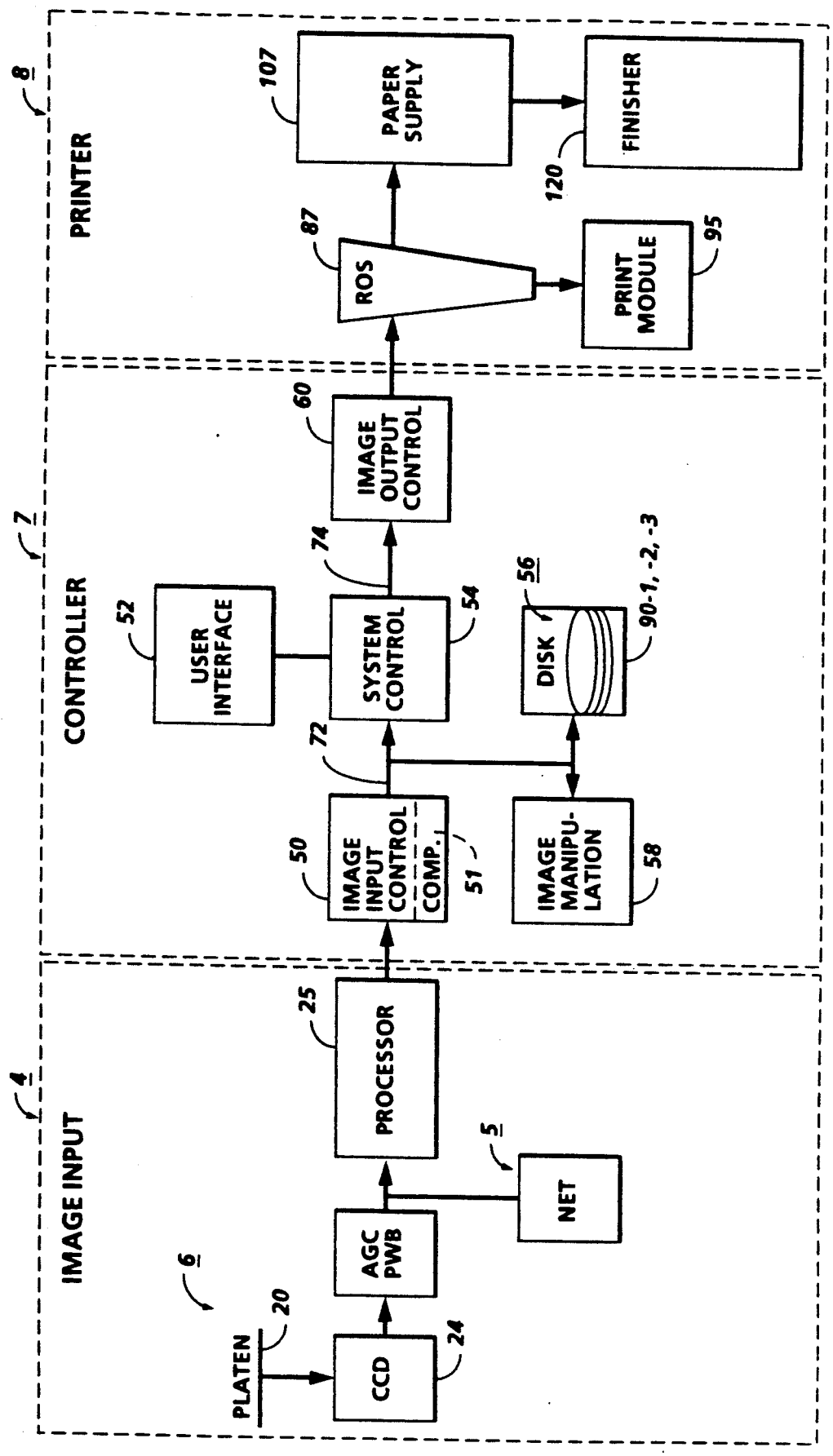
FIG. 2 is a block diagram depicting the major elements of the printing system shown in FIG. 1.

Referring to FIGS. 1 and 2, there is shown an exemplary image printing system 2 for processing print jobs in accordance with the teachings of the present invention. Printing system 2 for purposes of explanation is divided into image input section 4, controller section 7, and printer section 8. In the example shown, image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc. While a specific printing system is shown and described, the present invention may be used with other types of printing systems. For example, printer section 8 may instead use a different printer type such as ink jet, ionographic, etc.

Figure 3:
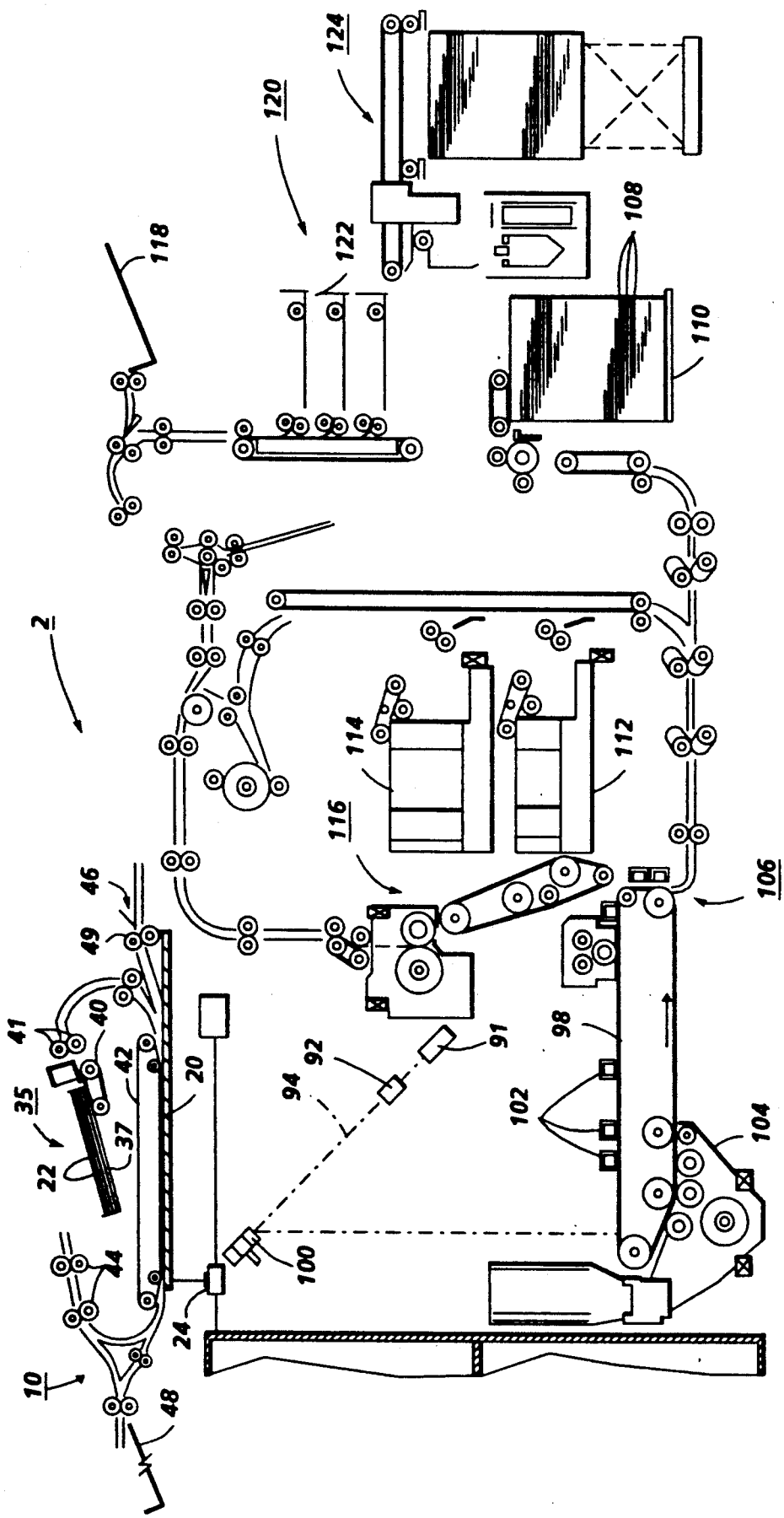
FIG. 3 is a plan view illustrating the principal mechanical components of the printing system shown in FIG. 1.
Figure 4:
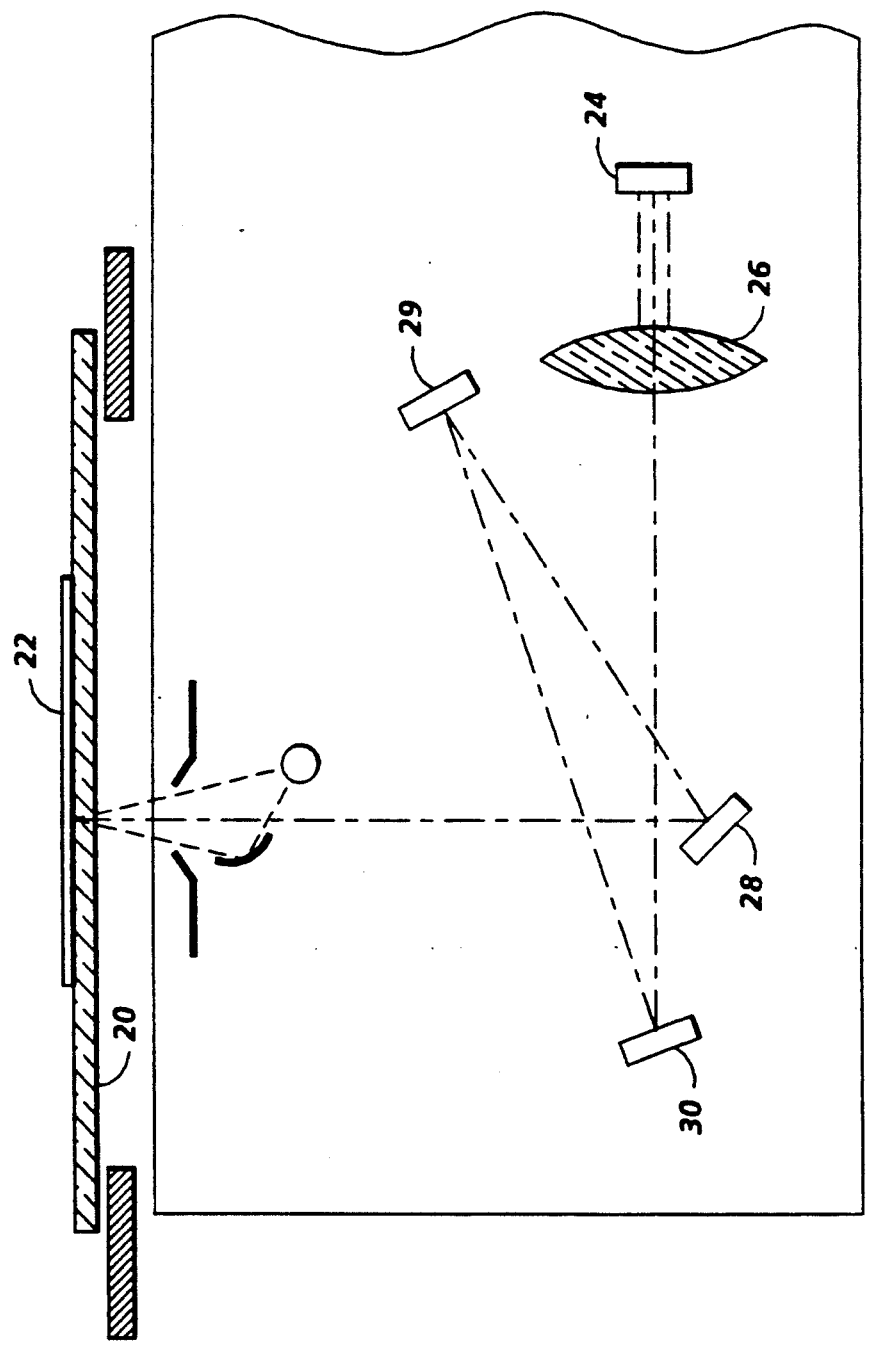
FIG. 4 is a schematic view showing certain construction details of the document scanner for the printing system shown in FIG. 1.

Referring particulary to FIGS. 2–4, for off-site image input, image input section 4 has a network 5 with a suitable communication channel such as a telephone line enabling image data in the form of image signals or pixels from one or more remote sources to be input to system 2 for processing. Where the Page Description Language (PDL) of the incoming imaging data is different than the PDL used by system 2, suitable conversion means (note shown) are provided. Other remote sources of image data such as streaming tape, floppy disk, etc. may be envisioned.

For on-site image input, section 4 has a document scanner 6 with a transparent platen 20 on which documents 22 to be scanned are located. One or more linear arrays 24 are supported for reciprocating scanning movement below platen 20. Lens 27 and mirrors 28, 29, 30 cooperate to focus array 24 on a line like segment of platen 20 and the document being scanned thereon. Image data in the form of image signals or pixels from net 5 or array 24 are input to processor 25 for processing. After processing, the image signals are output to controller section 7.

Processor 25 converts the analog image signals output by array 24 to digital. Processor 25 further processes image signals as required to enable system 2 to store and handle the image data in the form required to carry out the job programmed. Processor 25 also provides enhancements and changes to the image signals such as filtering, thresholding, screening, cropping, scaling, etc.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to palten 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 95 has has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a suitable print media, referred to as Paper Stock 108, delivered by Paper Supply section 107. Paper Stock 108 as will appear may comprise any of a variety of sheet sizes, types, and colors. For transfer, the Paper Stock is brought forward in timed registration with the developed image on photoreceptor 98 from either a main paper tray 110 or from auxiliary paper trays 112, or 114. The developed image transferred to the Paper Stock 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58, and image output controller 60.

Image data input from processor 25 of image input section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with master and slave image manipulation processors 59, 59' respectively of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Items such as files and icons displayed on touchscreen 62 are described herein as being actuated or opened by selecting the item and either touching the displayed item or pointing curser 67 at the item and keying mouse 66.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job. Various Job Ticket types are provided, with access by means of Job Types and Tickets icon 155. In the example shown in FIG. 7, the Job Ticket for printing multiple up images is displayed.

Job Tickets 150 have three programming levels, referred to as "Job Level", "Basic", and "Special", each having a series of icons for accessing the various programming selections available at that level. Each programming level has a Scorecard 152 associated with it so that on activation of a particular job level or of a specific icon, the appropriate Scorecard is displayed on touchscreen 62.

Referring to FIGS. 8 and 9, multiple up images 160 are by definition small images. The images may be derived by scanning such as by scanning in a business card, by cropping an image out of a larger document, by creating a master from multiple image sources, by input from an external source such as from a remote workstation via net 5, from disk, streaming tape, etc. type inputs. Multiple up images may also comprise a logo, special images generated by keyboard 64, etc. Whatever the multiple up image source, all the electronic image processing options that system 2 makes available, such as make ready, merge, etc. can be applied to multiple up images.

Normally, a plurality of images 160 are printed on a single sheet of Paper Stock 108 or other suitable Print. For efficiency and cost, it is desirable that the Paper Stock 108 be filled with the maximum number of images 160. Following printing, the individual images 160 that are printed are separated as by means of a guillotine type cutter, slitter, etc.

In the example shown, the multiple up image source is in the form of a document, i.e., card 162, which is scanned in by image input section 4 with the image content converted to image signals or pixels. As in the case of any document, scaling, editing, merging, etc. may be done prior to printing multiple copies.

Where the multiple up image 160 is derived from a document such as card 162, it will be understood that card 162, because of its small size, will occupy only a part of the area of platen 20 that will be scanned. As a result, the scanned image that results will include not only the multiple up image 160 but the entire platen area that is scanned as well. To remove the extraneous image areas following scanning, the scanned image is cropped.

Referring To FIGS. 7 and 10, to perform cropping, crop icon 166 at the "Special" Job Ticket level is actuated. Actuation of crop icon 166 displays "Special" scorecard 152 on touchscreen 62 showing Crop icon 166 opened together with Document display 170 representing the scanned image. Included in Document display 170 is a darkened area representing multiple up image 160. A Print display 172 depicts the scanned image including multiple up image 160 as it would appear if printed on the Paper Stock currently selected.

To enable the extraneous and unwanted parts of the scanned image to be removed, i.e., cropped, left and right side scrolling icons 174, 176 are displayed on screen 62 below the Document display 170. Through selective actuation of icons 174, 176, the side margins of multiple up image 160 are set. Top and bottom scrolling icons 178, 180 similarly allow the top and bottom margins of the multiple up image 160 to be set. The multiple up image source, i.e., card 162, is then rescanned with the cropped out image areas omitted and the image signals stored in main memory 56.

Where the document that is the source of the multiple up image 160 is a duplex document with images on both sides, the document must be turned over and scanned again. The system will attempt to register the second side image with the first side image. If the second side image will not fit, the operator will be presented with the option of having the second side image automatically scaled to a size that will register with the first side image. Alternately, the second side image is displayed on touchscreen 62 and the foregoing operator cropping process repeated. To facilitate cropping, crop icon 166 displays at 167 the margin settings of the previously processed first side of the multiple up image, enabling the operator to crop the second side image to the same margin settings as the first side image. Following setting of the second side image margins, the card 162 is re-scanned and the image signals for the second side image stored in main memory 56.

To facilitate registration of the opposing side images of a like-sized duplex multiple up image source with one another, the document, i.e., card 162, at the time of scanning is preferably located in registered position on platen 20 by abutting the card against suitable side and edge registration guides (not shown) on platen 20. Where this is done, the cropping procedure for the second side image described above may be avoided since the first and second side images are in registered relation with one another and hence the location and size of both scanned images are the same.

As will be understood, the size of the Paper Stock on which the multiple up images 160 are printed determines the number of images that can be printed on the chosen paper stock. Where Paper Stock of a size other than that programmed by the default setting (i.e., 8.5"×11") is desired, Paper Stock icon 182 of "Basic" Job Ticket programming level is actuated. Referring to FIGS. 7 and 11, this displays "Basic" scorecard 150 with the Paper Stock icon 182 opened. Additionally, the various Paper Stock Size, Type, and Color selections are displayed alongside scorecard 150 on touchscreen 62. By actuating the Paper Stock Size, Type, and/or Color icons desired, the specific Paper Stock onto which the multiple up images 160 will be printed is programmed.

As shown in FIG. 7, the default setting for Sides Imaged is simplex (i.e., "1>1"). Referring also to FIG. 12, where duplex images are printed, the Sides Imaged icon 184 is actuated to display the Sides Imaged selections. For duplex, the "1>2" Sides Imaged icon is actuated to program printing system 2 to make duplex prints.

Other programming changes from the default settings shown in FIG. 7 are similarly programmed, as for example where the number (i.e., Quantity) of prints to be made is different than the default setting (i.e., "1"), or where the multiple up image(s) are to saved for future use instead of being discarded (i.e., "Destination: Print & Delete") after the multiple up prints have been made, etc.

Referring now to FIGS. 13 and 14, programming data reflecting the size of the multiple up image 160 together with the size of the Paper Stock 108 on which the maximum number of multiple up images are to be printed is input to slave image manipulation processor 59' where the number of multiple up images that can be printed on the Paper Stock selected is determined together with image descriptors specifying the height and width of the images, print start and stop parameters, etc. The programming data is input to the master image manipulation processor 59 where the data is converted to control signals for operating printer section 8 to make the number of prints programmed. Where duplex multiple up images are printed, a second set of multiple up images representing the second side of the image are printed in registered relation with the first set of multiple up images on the opposite side of the Paper Stock, the Paper Stock being inverted and returned to transfer station 106 for this purpose.

While the invention has been described with reference to the structure disclosed, it is not confined to the details set forth, but is intended to cover such modifications or changes as may come within the scope of the following claims.

I claim:

1. A process for printing multiples of a reduced size first print image on a sheet of paper stock in an electronic reprographic printer, comprising the steps of:
   a) providing an electronic page comprised of image signals representative of said first print image;
   b) from said electronic page, determining a size of said first print image;
   c) determining a size of the sheet of paper stock on which said first print images are to be printed by said printer;
   d) determining the maximum number N of said first print images to be optimally fitted onto said sheet of paper stock without interference; and
   e) in a single pass, using said electronic page to print said first print images N times on each sheet of said paper stock.

2. The process according to claim 1 including the step of:
   scanning a document to provide said image signals representative of said first print image.

3. The process according to claim 2 including the step of:
   where said document includes extraneous images, cropping said electronic page to provide said first print image.

4. The process according to claim 2 including the step of:
   where a image on said document is larger than said up first print image, scaling said electronic page to provide said first print image.

5. The process according to claim 1 in which a second print image is printed in opposing relation to said first print image on a second side of said sheet of paper stock including the steps of:
   automatically scaling said second print image to the same size as said first print image, and
   registering said second print image on said second side of said sheet of paper stock with said first print image on said sheet of paper stock when printing.

6. The process according to claim 2 including the steps of:
   a) scanning a opposite side of said reduced size document to provide image signals representative of said second print image;
   b) adjusting said second an print image to the same size as said first side print image; and
   c) in a second pass, printing said second print image N times on an opposite side of said sheet of paper stock with each of said N second side print images in registered relation with said first side print images.

7. A process for printing multiple copies of the image from a reduced size document on a print media in an electronic printing system having a printer for producing prints on said print media, a document scanner including a platen for scanning documents and converting the document images to image signals, and a user interface including a screen for displaying programming selections for inputting programming instructions to said system, comprising the steps of:

a) locating said reduced size document on said platen;

b) actuating said scanner to scan said platen and said document to produce image signals of the platen area scanned including said document image;

c) using said image signals to display the platen area scanned and said document image on said screen;

d) cropping said platen area displayed on said screen to isolate said document image and establish the size of said document image for printing;

e) identifying the size of the print media on which multiple copies of said document image are to be printed;

f) using the size of said document image from step d and the size of said print media from step e, determining the number N of times said document image can be fitted on said print media for printing by said printer; and g) programming said printer to repeatedly print said document image N times on said print media.

8. The process according to claim 7 including the steps of:

a) re-locating said reduced size document on said platen to scan the second side image on the opposite side of said document;

b) actuating said scanner to scan said platen and said document opposite side to produce image signals of the platen area scanned including said document second side image;

c) using said image signals to display the platen area scanned and said document second side image on said screen;

d) cropping said platen area on said screen to isolate said document second side image and register said document second side image with said document first side image; and e) programming said printer to repeatedly print said document second side image on the opposite side of said print media N times in registered relation with each of said document first side images printed on said print media.

9. The process according to claim 7 including the step of:

programming said printer to print said print media a preselected number of times.

10. A process for operating an electronic reprographic printer to repeatedly print a reduced size document on a single sheet of paper stock, comprising the steps of:

a) scanning said reduced size document to provide image signals representative of said reduced size document;

b) determining the size of said reduced size document;

c) determining the size of the paper stock on which copies of said reduced size document are to be printed by said printer;

d) calculating the maximum number of times N said reduce size document can be printed on each sheet of said paper stock without interference; and e) in a single pass, repeatedly printing said reduced size document N times on each sheet of said paper stock.

* * * * *